United States Patent
Kern et al.

(10) Patent No.: US 8,905,378 B2
(45) Date of Patent: Dec. 9, 2014

(54) HYDRAULIC TENSIONING DEVICE FOR A FLEXIBLE DRIVE MEANS

(75) Inventors: Roman Kern, Forchheim (DE); Reinhard Koch, Wachenroth (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 874 days.

(21) Appl. No.: 13/128,038

(22) PCT Filed: Oct. 7, 2009

(86) PCT No.: PCT/EP2009/063045
§ 371 (c)(1),
(2), (4) Date: Aug. 26, 2011

(87) PCT Pub. No.: WO2010/052086
PCT Pub. Date: May 14, 2010

(65) Prior Publication Data
US 2011/0297906 A1    Dec. 8, 2011

(30) Foreign Application Priority Data
Nov. 6, 2008 (DE) .................. 10 2008 056 275

(51) Int. Cl.
F16H 7/12 (2006.01)
F16H 7/08 (2006.01)

(52) U.S. Cl.
CPC ...... *F16H 7/1236* (2013.01); *F16H 2007/0806* (2013.01); *F16H 2007/0817* (2013.01); *F16H 2007/0859* (2013.01)
USPC ...................................... 254/93 R; 254/89 H

(58) Field of Classification Search
CPC ................. F16H 2007/0806; F16H 2007/0812

USPC .............. 474/110; 254/93 R, 89 H, 134, 2 B; 269/32, 24

See application file for complete search history.

(56) References Cited

U.S. PATENT DOCUMENTS

| 4,874,352 | A | * | 10/1989 | Suzuki ........................ 474/110 |
| 4,909,777 | A | * | 3/1990 | Inoue et al. .................. 474/110 |
| 5,259,820 | A | * | 11/1993 | Mott ............................. 474/110 |
| 5,346,436 | A | * | 9/1994 | Hunter et al. ................ 474/110 |
| 5,569,105 | A | * | 10/1996 | Sakai et al. .................. 474/110 |

(Continued)

FOREIGN PATENT DOCUMENTS

| DE | 19828309 | 12/1999 | |
| DE | 202007002456 | 8/2008 | |
| EP | 0989329 | 3/2000 | |
| EP | 989329 A2 | * 3/2000 | ............... F16H 7/08 |

*Primary Examiner* — Lee D Wilson
*Assistant Examiner* — Tyrone V Hall, Jr.
(74) *Attorney, Agent, or Firm* — Volpe and Koenig, P.C.

(57) ABSTRACT

A hydraulic tensioning device (1) for a flexible drive element, particularly for a chain or a belt, is provided, and includes a housing (2) that has a cylindrical inner surface (3) at least in some regions, a piston (4) is arranged in the housing (2) in an axially displaceable manner, and an inner chamber (5) is formed by the housing (2) and the piston (4) for receiving hydraulic fluid. At least one vent hole (6) is integrated in the housing (2) and/or in the piston (4) is in contact with the surroundings (U). In order to provide a reliably ventilated system that has a simple design and that can be implemented in a cost-effective manner, a sealing element (7) is arranged in a region of the vent hole (6), and the sealing element is permeable to gas but not to hydraulic fluid.

14 Claims, 1 Drawing Sheet

(56) References Cited

U.S. PATENT DOCUMENTS

| | | | |
|---|---|---|---|
| 5,577,970 A * | 11/1996 | Smith et al. | 474/110 |
| 5,700,213 A * | 12/1997 | Simpson et al. | 474/110 |
| 5,718,650 A * | 2/1998 | Smith et al. | 474/110 |
| 5,720,684 A * | 2/1998 | Mott | 474/110 |
| 6,139,454 A * | 10/2000 | Simpson | 474/110 |
| 6,165,090 A * | 12/2000 | Simpson | 474/110 |
| 6,203,461 B1 * | 3/2001 | Watanabe et al. | 474/110 |
| 6,322,468 B1 * | 11/2001 | Wing et al. | 474/110 |
| 6,361,458 B1 * | 3/2002 | Smith | 474/109 |
| 6,592,479 B2 * | 7/2003 | Nakakubo et al. | 474/109 |
| 6,623,390 B2 * | 9/2003 | Simpson et al. | 474/110 |

* cited by examiner

HYDRAULIC TENSIONING DEVICE FOR A FLEXIBLE DRIVE MEANS

FIELD OF THE INVENTION

The invention relates to a hydraulic tensioning device for a flexible drive element, in particular, for a chain or a belt, wherein this device comprises a housing with a cylindrical inner surface at least in some sections, wherein a piston is arranged so that it can move in the axial direction in the housing, and wherein an inner space formed by the housing and the piston for holding hydraulic fluid is in connection with the surroundings via at least one ventilation drill hole machined into the housing and/or into the piston.

BACKGROUND

Hydraulic tensioning devices for chain or belt drives are known in the prior art. A tensioning device according to the class is described in DE 198 28 309 A1. In that document, a piston is arranged so that it can move in the axial direction in an element functioning as a hydraulic cylinder, wherein hydraulic fluid is located in the resulting inner space. The problem-free functioning of the desired hydraulic damping effect requires the ventilation of the system. To this end, the housing of the known tensioner carrying the cylinder has a ventilation opening.

DE 20 2007 002 456 U1 exhibits a similar solution. Also here, in a piston-cylinder system, a ventilation device is arranged that is sealed here with a valve body in the form of a ball.

The production of the ventilation possibility requires relatively high production-related expenses in the known solutions. This results in corresponding costs, not only costs concerning the production of the required parts, but also with respect to the assembly of the tensioner.

SUMMARY

The present invention is based on the objective of refining a tensioning device of the type noted above so that it is possible to disclose a reliably vented system that distinguishes itself through a simple configuration and that can thus be realized in an economical way.

The solution by the invention for meeting this objective is characterized in that, in the region of the ventilation drill hole, a sealing element is arranged that is permeable for gas and is impermeable for hydraulic fluid.

As the material for such a sealing element, various solutions could be considered, as will be discussed farther below. It is essential that a problem-free ventilation of the inner space of the piston-cylinder system can take place without hydraulic fluid being discharged.

The sealing element could be arranged on the inner wall of the housing and/or on the inner wall of the piston. It could have a plate-shaped or disk-shaped construction.

A tensioning spring that can generate a spring force between the housing and the piston is usually arranged in the inner space. In this case, it is advantageously provided, preferably with respect to production and assembly, that the tensioning spring presses the plate-shaped or disk-shaped sealing element against the inner wall of the housing and/or the piston.

According to another solution, the sealing element can comprise a carrier element that holds at least one gas-permeable membrane. Here, the carrier element preferably has a rotationally symmetric construction. It is advantageous when the carrier element holds two gas-permeable membranes with a defined spacing. Advantageously, a filler can then be arranged between the membranes. This could involve sand, for example.

The sealing element advantageously is formed of porous material or has such material. It could be made from plastic, ceramic material, or sintered metal.

In accordance with the invention, it is possible to guarantee a reliable ventilation of the hydraulic pressure space and thus an optimization of the desired hydraulic damping effect of the tensioning system. This can be achieved in a simple and economical way. The required parts for the tensioning element and especially for the ventilation are few in terms of number and economical in terms of production. The assembly also has a simple and thus economical configuration.

DETAILED DESCRIPTION OF THE PREFERRED EMBODIMENTS

Figure 1:
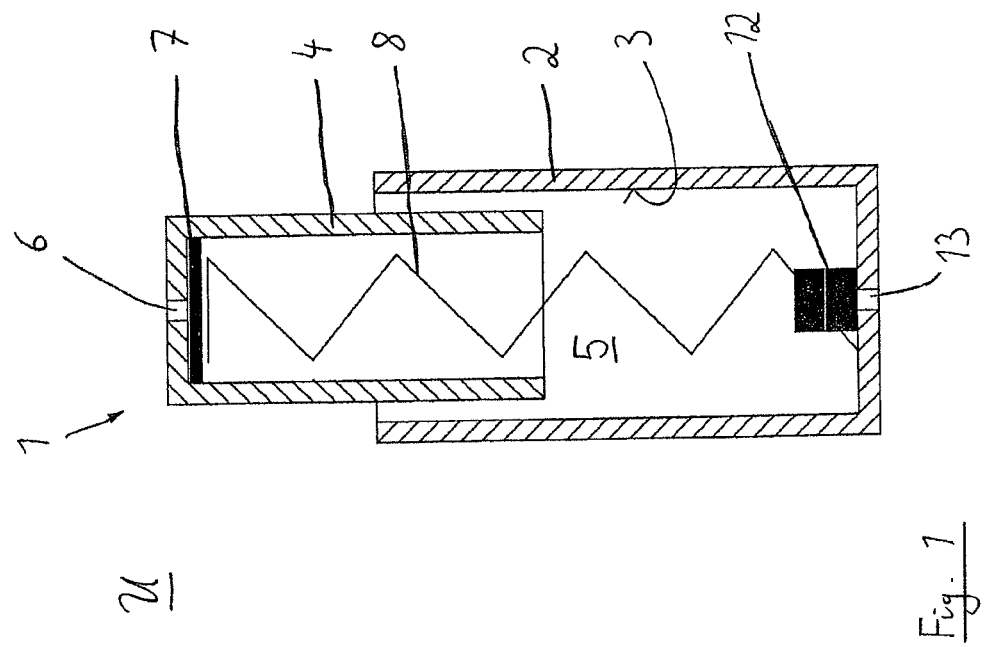
FIG. 1, schematically, in a front view shown in section, a tensioning device of a belt or chain tensioner, and FIG. 2, schematically, in a sectioned front view, a sealing element of the tensioning device in an alternative construction.

In FIG. 1, a tensioning device 1 of a chain tensioner is shown schematically whose functioning has been known for a long time. Reference is made explicitly here to DE 198 28 309 A1 and DE 20 2007 002 456 U1 in which such tensioning devices are described.

The central element of the tensioning device 1 is a housing 2 that acts as a hydraulic cylinder and has a cylindrical inner surface 3. This is used for guiding a piston 4 that is arranged so that it can move in the axial direction in the housing 2. Because the piston 4 is constructed as a hollow cylinder-housing 2 and piston 4 form an inner space 5 that can be filled with hydraulic fluid.

For ensuring a problem-free hydraulic damping of the system, it is required that the inner space 5 can be vented. For this purpose, the piston 4 has a ventilation drill hole 6. Naturally, the passage between inner space 5 and surroundings U is not allowed to be open, in order not to allow the hydraulic fluid to escape. Therefore, a sealing element 7 is arranged in front of the ventilation drill hole 6. More precisely, the sealing element 7 is positioned on the inner wall of the piston 4 in front of the ventilation opening 6.

The piston-cylinder system is loaded elastically—as in the solutions noted above—by a tensioning spring 8 acting in the axial direction. The tensioning spring is here mounted so that it holds the sealing element 7 in position, i.e., presses against the inner wall of the piston 4.

In the solution according to FIG. 1, the sealing element comprises a disk made from porous material, for example, made from sintered metal that is indeed permeable for gas (air) due to the existing micro-pores, but is impermeable for hydraulic fluid.

Due to the gas permeability of the sealing element 7, a gas exchange is possible between inner space 5 and surroundings U, i.e., a ventilation of the inner space 5 can take place.

In the lower region, the housing 2 has a drill hole 13, with a non-return valve 12 bordering this hole, as is typical in constructions according to the class.

Figure 2:
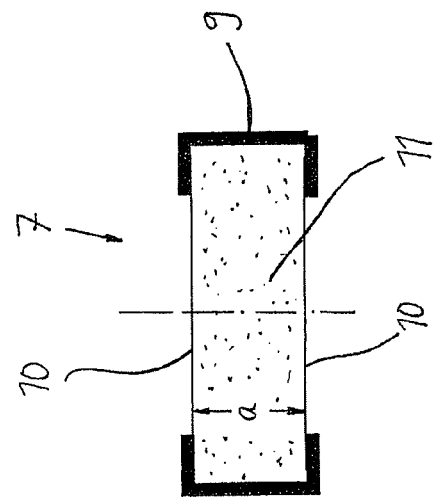

The solution according to FIG. 2 does not have—as in FIG. 1—a plate or disk made from gas-permeable material as the sealing element, but instead the sealing element 7 is a multi-part component.

This comprises carrier element 9 that has a rotationally symmetric construction, so that it likewise has a disk shape. The carrier element 9 holds two gas-permeable membranes 10 with a spacing a. A filler 11 is arranged between the membranes 10—somewhat as a support element—with the filler involving sand in the embodiment. Consequently, the sealing element 7 according to FIG. 2 also fulfills the stipulated problem, i.e., it is permeable for gas (air), but is not for hydraulic fluid.

LIST OF REFERENCE SYMBOLS

1 Tensioning device
2 Housing
3 Cylindrical inner surface
4 Piston
5 Inner space
6 Ventilation drill hole
7 Sealing element
8 Tensioning spring
9 Carrier element
10 Gas-permeable membrane
11 Filler
12 Non-return valve
13 Drill hole
U Surroundings
a Spacing

The invention claimed is:

1. Hydraulic tensioning device for a flexible drive element, the device comprises a housing with a cylindrical inner surface at least in some sections, a piston is arranged for movement in an axial direction in the housing and an inner space formed by the housing and the piston for holding hydraulic fluid is in connection with the surroundings via at least one ventilation hole machined into at least one of the housing or the piston, and in a region of the ventilation hole, a sealing element is arranged that is permeable for gas and is impermeable for hydraulic fluid.

2. Tensioning device according to claim 1, wherein the sealing element is arranged on at least one of an inner wall of the housing or on an inner wall of the piston.

3. Tensioning device according to claim 1, wherein the sealing element has a plate-shaped or disk-shaped construction.

4. Tensioning device according to claim 1, wherein a tensioning spring is arranged in the inner space, and the spring generates a spring force between the housing and the piston.

5. Tensioning device according to claim 2, wherein a tensioning spring presses the plate-shaped or disk-shaped sealing element against the inner wall of the housing or of the piston.

6. Tensioning device according to claim 1, wherein the sealing element comprises a carrier element that holds at least one gas-permeable membrane.

7. Tensioning device according to claim 6, wherein the carrier element has a rotationally symmetric construction.

8. Tensioning device according to claim 6, wherein the carrier element holds two gas-permeable membranes with a defined spacing.

9. Tensioning device according to claim 8, wherein a filler is arranged between the membranes.

10. Tensioning device according to claim 9, wherein the filler is sand.

11. Tensioning device according to claim 1, wherein the sealing element is made from a porous material.

12. Tensioning device according to claim 1, wherein the sealing element is made from plastic.

13. Tensioning device according to claim 1, wherein the sealing element is made from ceramic material.

14. Tensioning device according to claim 1, wherein the sealing element is made from sintered metal.

* * * * *